March 4, 1958  V. K. LANGHART ET AL  2,825,671
PRESSING APPARATUS FOR GLASS LAMINATES
Filed Dec. 22, 1954  9 Sheets-Sheet 1

INVENTORS
VICTOR K. LANGHART &
CHARLES O. HUFFMAN
Oscar L. Spencer
ATTORNEY

March 4, 1958  V. K. LANGHART ET AL  2,825,671
PRESSING APPARATUS FOR GLASS LAMINATES
Filed Dec. 22, 1954  9 Sheets-Sheet 3

INVENTORS
VICTOR K. LANGHART
CHARLES O. HUFFMAN
Oscar L. Spencer
ATTORNEY

March 4, 1958 V. K. LANGHART ET AL 2,825,671
PRESSING APPARATUS FOR GLASS LAMINATES
Filed Dec. 22, 1954 9 Sheets-Sheet 4

INVENTORS
VICTOR K. LANGHART and
CHARLES O. HUFFMAN

Oscar L. Spencer
ATTORNEY

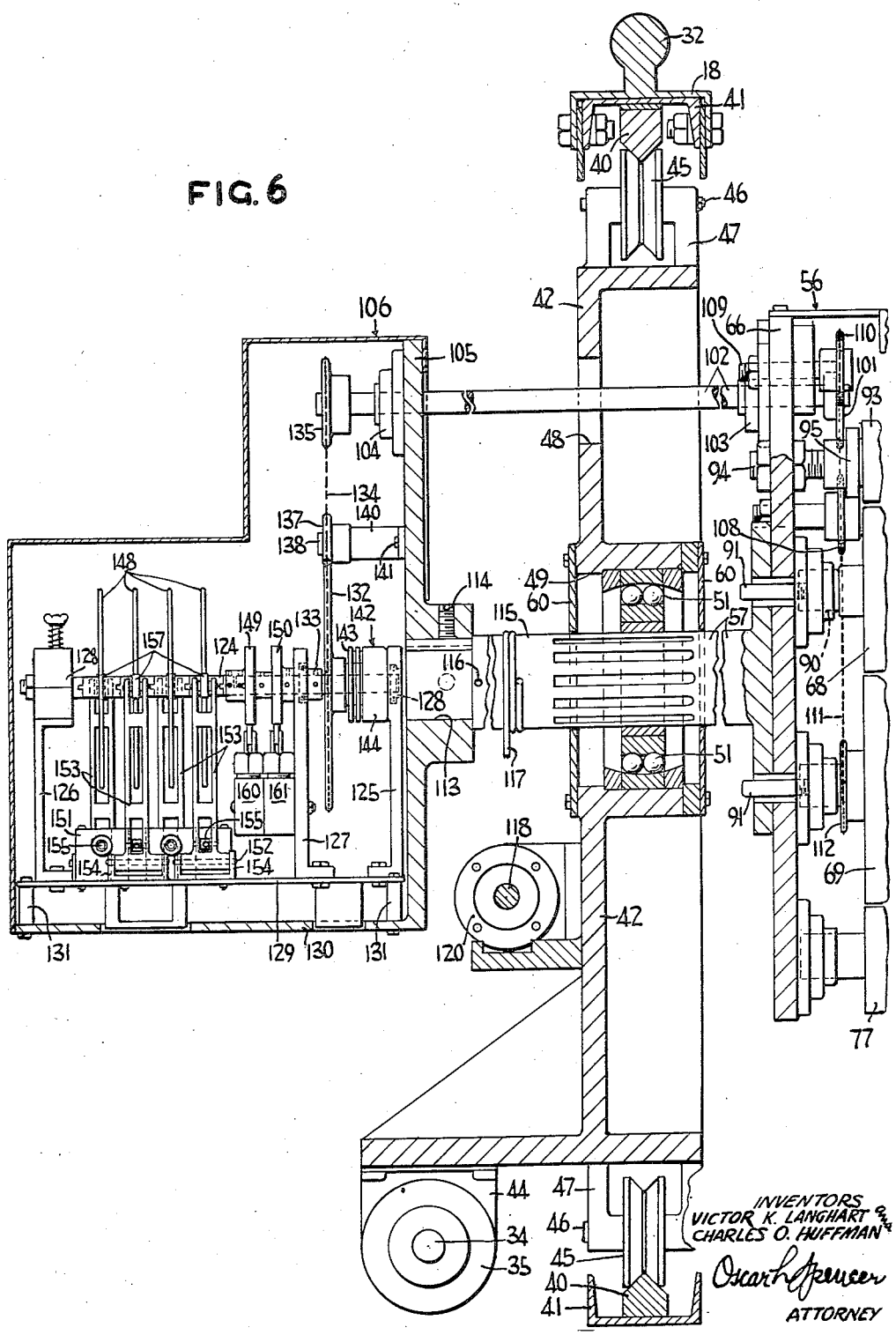

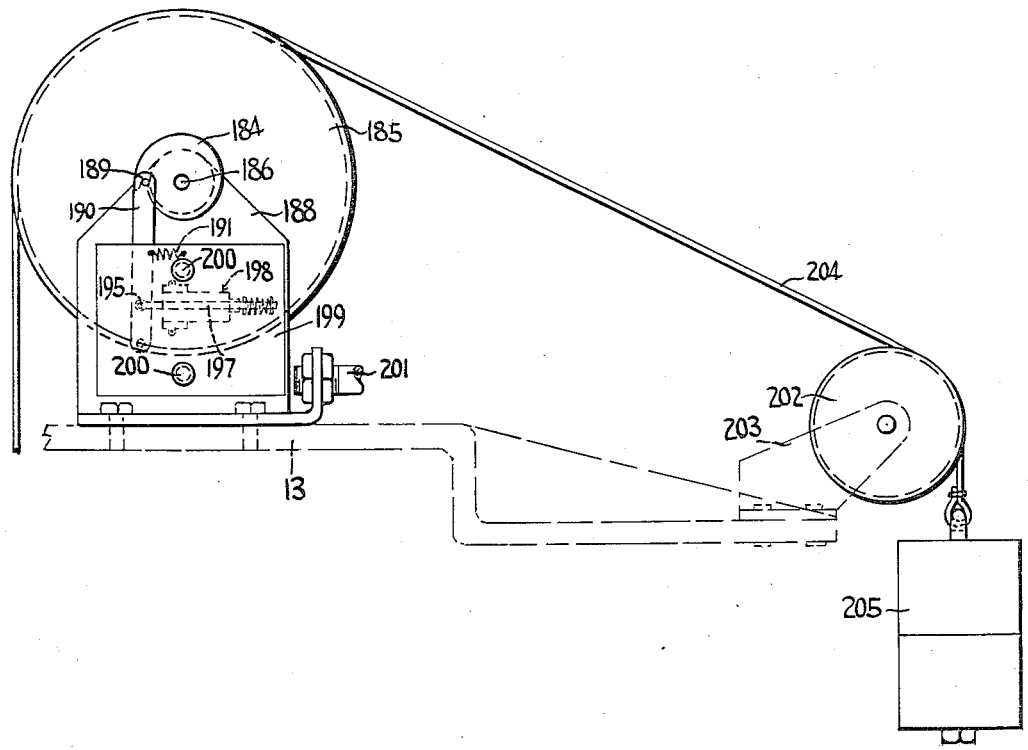
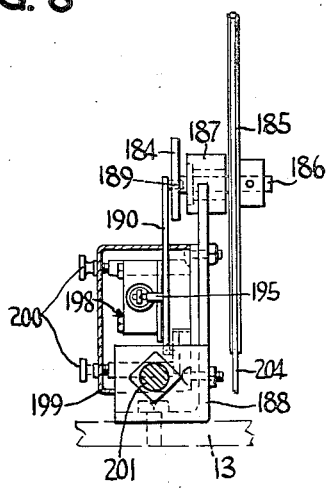
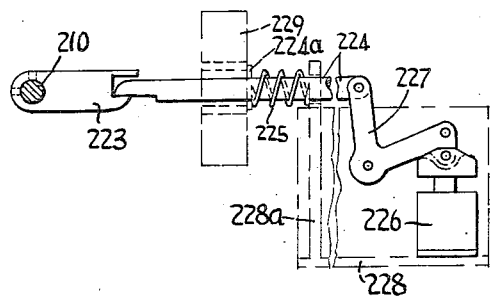

INVENTORS
VICTOR K. LANGHART
CHARLES O. HUFFMAN
Oscar L. Spencer
ATTORNEY

March 4, 1958 V. K. LANGHART ET AL 2,825,671
PRESSING APPARATUS FOR GLASS LAMINATES
Filed Dec. 22, 1954 9 Sheets-Sheet 8
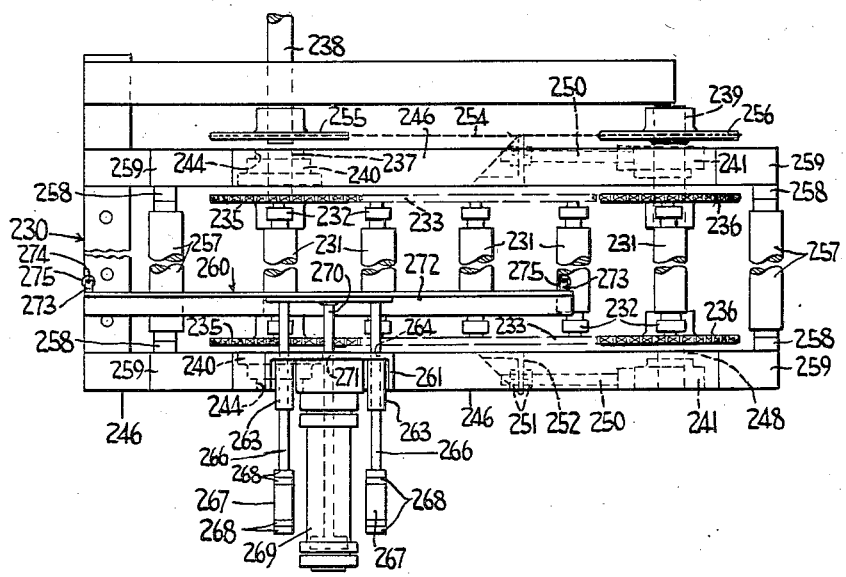
FIG. 11
FIG. 9
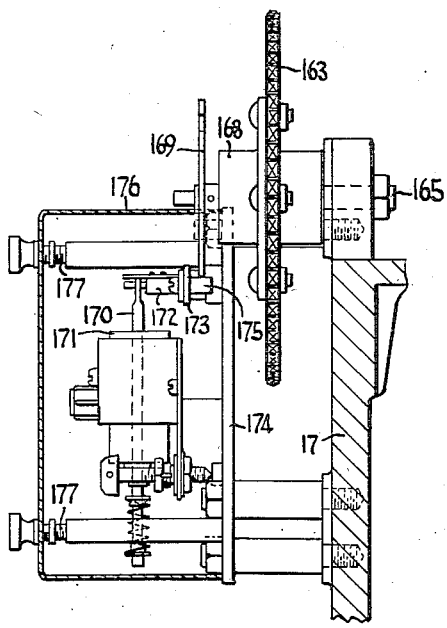
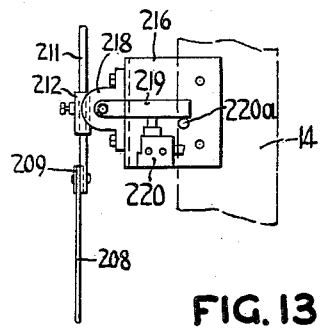
FIG. 13
INVENTORS
VICTOR K. LANGHART and
CHARLES O. HUFFMAN
Oscar H. Spencer
ATTORNEY March 4, 1958 V. K. LANGHART ET AL 2,825,671
PRESSING APPARATUS FOR GLASS LAMINATES
Filed Dec. 22, 1954 9 Sheets-Sheet 9

INVENTORS
VICTOR K. LANGHART &
CHARLES O. HUFFMAN
BY
Oscar L. Spencer
ATTORNEY

United States Patent Office 2,825,671
Patented Mar. 4, 1958

2,825,671

PRESSING APPARATUS FOR GLASS LAMINATES

Victor K. Langhart and Charles O. Huffman, Pittsburgh, Pa., assignors to Pittsburgh Plate Glass Company Application December 22, 1954, Serial No. 476,978

16 Claims. (Cl. 154—2.7)

This invention relates to laminated glass and in particular relates to apparatus for pressing of bent glass laminated assemblies comprising two matched sheets of curved glass and a thermoplastic interlayer, especially for the preliminary pressing of the laminated assemblies prior to placing the assemblies in an autoclave for completion of the laminating process.

In the manufacture of laminated assemblies it is desirable to obtain an overall adhesive bond between glass sheets and a thermoplastic interlayer by subjecting the assembled sheets to heat and pressure while immersed in an oil in an autoclave. Unless the edges of the laminated assemblies are sealed or otherwise protected, the oil in the autoclave may penetrate between the laminated elements and discolor the assembly. In manufacturing flat laminated assemblies, the assembled sheets are subjected to a preliminary pressing by passing the assembly between one or more pairs of rolls covered with a suitable resilient material. These resilient or yieldable rolls are commonly called nipper rolls. This preliminary pressing forces the air out from between the assembled sheets and provides a sufficient seal extending over the entire area of the sheets to prevent damage from the oil when the assembly is directly immersed therein in the autoclave for the final pressing operation.

In the manufacture of bent or curved laminated assemblies such as, for example, curved windshield panels, it is necessary to mount the pair of nipper rolls so that the pair can rotate about their line of contact to provide pressing of the assembly with the pressure being approximately normal to the surfaces of the laminated assembly. In the development of one-piece automobile windshields, the curvature of the assembly has become more complicated. There is not only a curvature along the length of the assembly with sharp bends near the ends of the assembly, but in addition the ends are twisted about the longitudinal axis. In the preliminary pressing of laminated assemblies having such compound curvature, the apparatus should not only permit the pair of yieldable rolls to rotate about their line of contact as the longitudinal curvature of the glass requires but also should allow movement of the ends so that the nipper rolls provide even pressure on ends of the assemblies where there is twisting along a transverse axis of the assembly. With the combination of the sharp bends at the ends of the longitudinal curvature and the twisting of the ends for the glass laminated assembly embodied in the structure commonly known as a wrap-around windshield, it is not satisfactory merely to construct the apparatus for preliminary pressing so that each end of the pair of yieldable rolls can be moved by the glass assembly in a plane perpendicular or otherwise cutting across the axis of contact of the rolls as the glass assembly passes therethrough. When the assembly itself is required to force the ends of the nipper rolls to move in horizontal and vertical directions considerable glass breakage occurs.

An object of the present invention is to provide a preliminary pressing apparatus with a pair of yieldable rolls that will be mechanically moved at their ends in horizontal and vertical directions in a predetermined manner so that their positions will anticipate the twist of the glass along its longitudinal axis.

Another object of the invention is to provide a pressing apparatus which will provide uniform pressing contact across the laminated assembly so that breakage of assemblies during prepressing is greatly reduced or eliminated.

A still further object of the present invention is to provide a pressing apparatus in which means are provided for insuring that the ends of the pair of yieldable rolls are moved horizontally and vertically in a predetermined controlled manner.

These and other objects of the present invention will be apparent to those skilled in this art from the following description of a preferred embodiment of the prepressing assembly apparatus along with the drawings.

Briefly, the apparatus comprises a pair of driven nipper rolls mounted in frictional engagement in a rotatable roll housing. The roll housing is mounted to a pair of spaced plates which are movably mounted in relationship to a fixed housing. The spaced plates are moved in vertical and horizontal directions relative to the fixed housing in a controlled and predetermined manner by means of hydraulic cylinders actuated through cams rotating with the nipper rolls upon actuation of a trip mechanism by an approaching bent glass laminated assembly. Control of plate positioning as called for by one of the cams is provided by feed-back mechanism actuated by vertical or horizontal movement of a spaced plate.

In the drawings:

Figure 6 is an enlarged fragmentary cross section taken along the line 6—6 of Figure 2, showing details of the cam-operated control assembly;

Figure 7 is an enlarged fragmentary view of the vertical follower control mechanism shown in Figure 3;

Figure 8 is an elevation, partly in section, of the pulley and the cam-operated feed-back differential transformer of Figure 7;

Figure 9 is an enlarged cross section of the horizontal follower control mechanism taken along the line 9—9 of Figure 3 except for the section through the transformer cover;

Figure 11 is a top plan of the conveyor assembly for delivery of glass laminated assemblies and including an alignment assembly;

Figure 12 is an enlarged cross section of the device for preventing oscillation of the trip starting mechanism taken along the line 12—12 of Figure 1;

Figure 13 is an enlarged side elevation of trip starting mechanism; and

Figure 1:
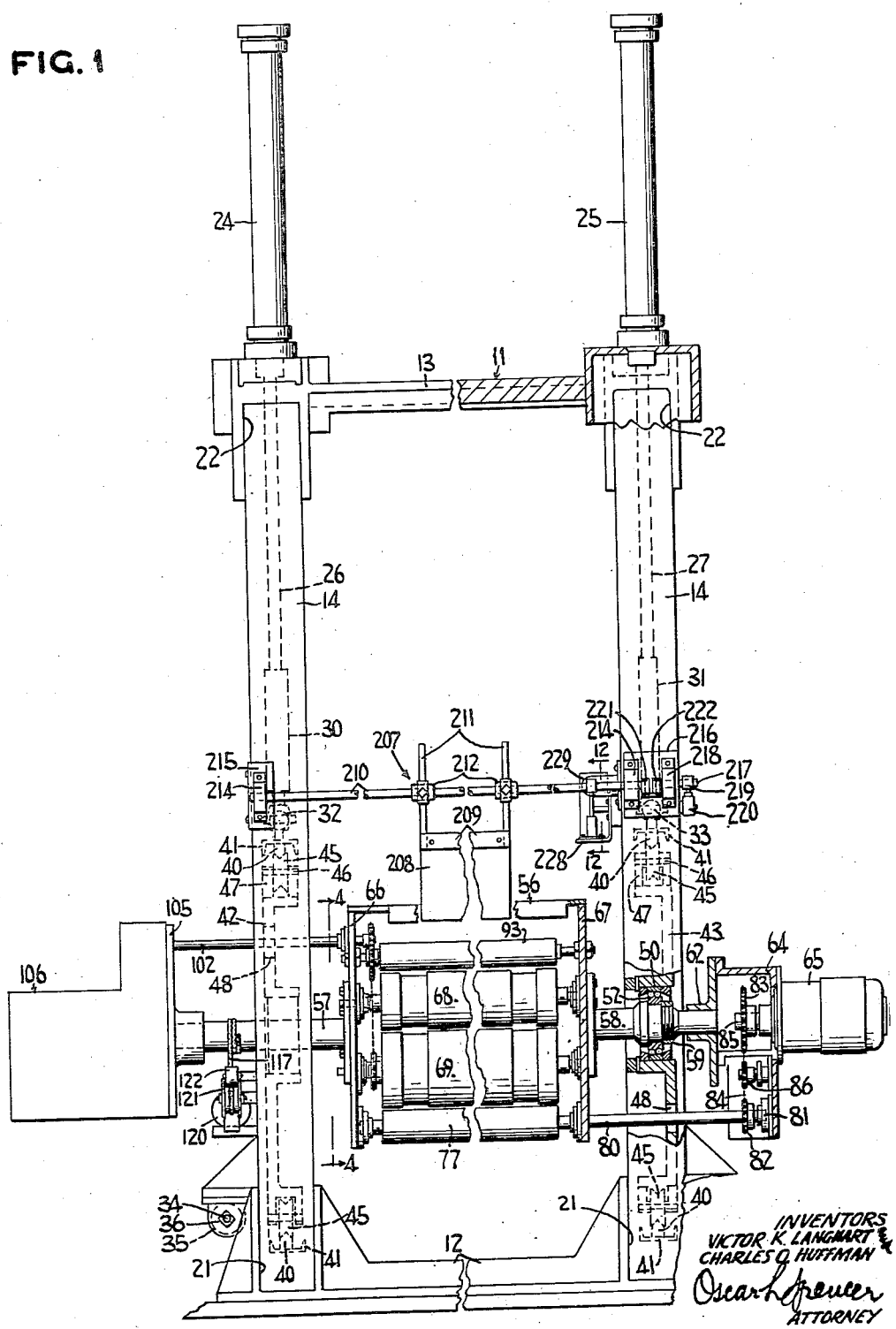
Figure 1 is a front elevation of the preliminary pressing apparatus partly in section and showing a portion broken away.
Figure 2:
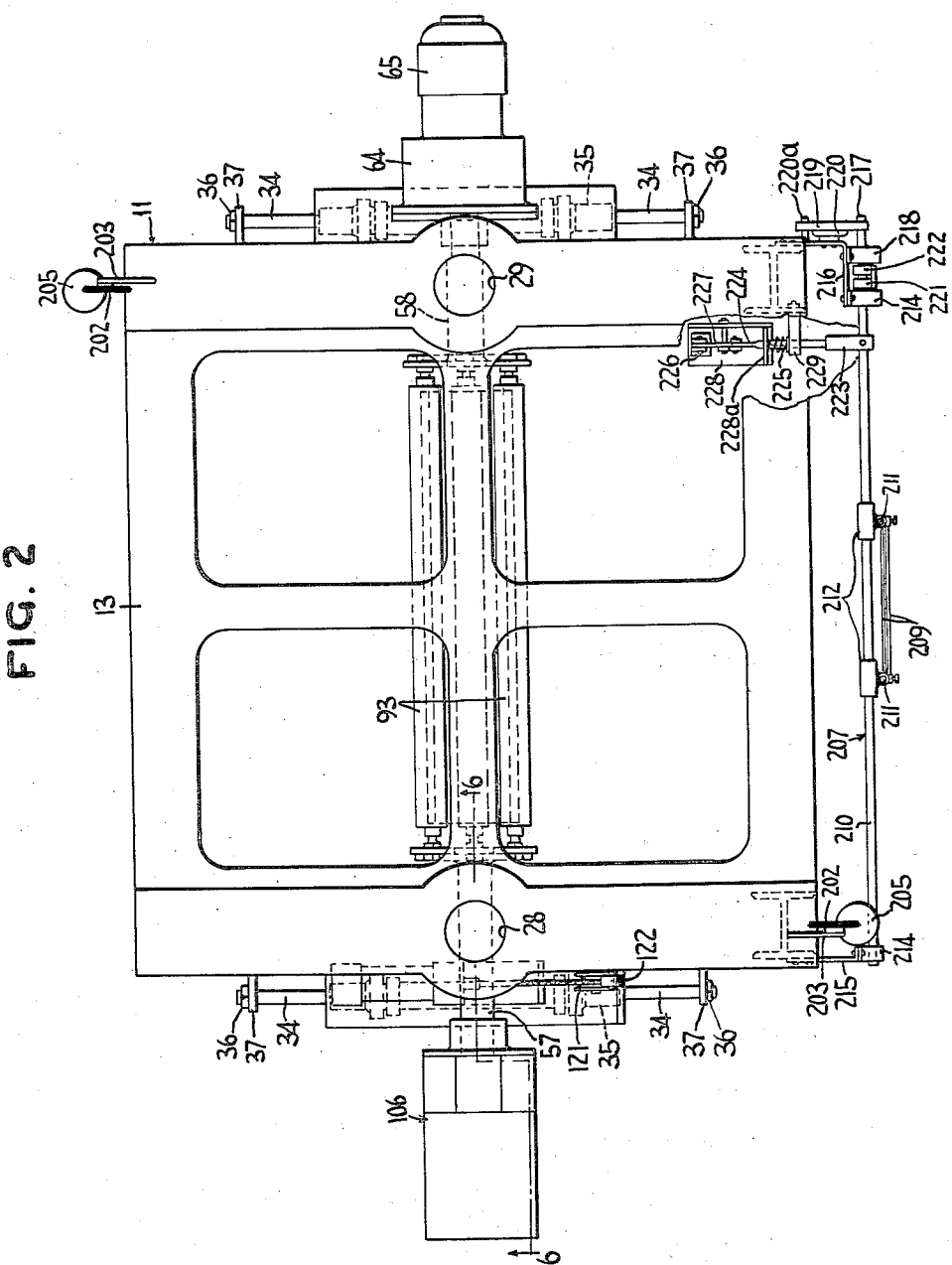
Figure 2 is a fragmentary top plan view, partially broken away, of the apparatus shown in Figure 1.

The pressing apparatus has a fixed housing generally indicated at 11 comprising a base 12, a top member 13 and supporting pillars 14 connected to base 12 and top member 13. Movable frames generally indicated at 15 are mounted at opposite sides of fixed housing 11 and each frame comprises vertical supports 17 and horizontal plates 18 connected thereto for maintaining vertical supports 17 in spaced parallel arrangement. Supporting columns 20 are held in vertical position by having their ends in wells 21 and 22 of base 12 and top member 13, respectively. Part of the surface of vertical supports 17 is concave for sliding contact with the cylindrical surface of supporting columns 20 during vertical movement of frames 15.

Opposite sides of top member 13 have vertically mounted thereon flange-mounting hydraulic cylinders 24 and 25. Piston rods 26 and 27 of hydraulic cylinders 24 and 25, respectively, are downwardly disposed through openings 28 and 29, respectively, in top member 13. Connected to rods 26 and 27 are hangers 30 and 31, respectively, which are connected to horizontal plates 18 by means of ball joints 32 and 33, respectively.

Piston rods 34 of horizontal hydraulic cylinders 35 are connected by nuts 36 to the flanges 37 of lower ends of vertical supports 17. Each of top horizontal plates 18 has a track 40 fastened to its underside by means of track support 41. Similarly bottom plates 18 have tracks 40 fastened to their upper sides by means of track support 41. Spaced plates 42 and 43 are connected to horizontal hydraulic cylinders 35 by means of mounting members 44 on cylinders 35. Wheels 45 on shafts 46 are mounted in supporting members 47 fastened to top and bottom of plates 42 and 43 and are in rotating contact against tracks 40. Thus wheels 45 and tracks 40 maintain the plates 42 and 43 in vertical position with horizontal movement provided by cylinders 35.

Spaced plates 42 and 43 contain slots 48. Plates 42 and 43 also contain bores 49 and 50 in which are mounted spherical bearings 51 and 52. A roll housing generally indicated at 56 has trunnions 57 and 58. Trunnion 58 is mounted in bore 50 by spherical bearing 52 which is held on trunnion 58 by collar 59. Seals 60 bolted on plates 42 and 43 keep spherical bearings 51 and 52 free of dust. Flanged sleeve 62 mounted on trunnion 58 has connected to it motor mounting 64 on which is mounted motor 65.

End plates 66 and 67 of roll housing 56 have trunnions 57 and 58 bolted thereon and support nipper rolls 68 and 69 in frictional rolling engagement by means of bearings 70. Nipper rolls 68 and 69 are preferably mounted so that their line of contact is coaxial with trunnions 57 and 58. Balance bar 71 is bolted to the top of plates 66 and 67. Back-up rolls 75 and driving back-up roll 77 are mounted on plates 66 and 67 in rolling contact with nipper roll 69. Shaft 80 at one end of driving back-up roll 77 extends through plate 67 and spaced plate 43. The end of shaft 80 is journaled to motor mounting 64 by bearing 81. Within motor mounting 64 and on shaft 80 is mounted sprocket 82 which is driven by sprocket 83 through chain 84. Sprocket 83 is mounted on shaft 85 of motor 65. Chain 84 also engages idler sprocket 86 mounted on motor mounting 64.

The shafts 90 at one end of the nipper rolls 68 and 69 are hollow and are internally threaded for receiving nipples 91 to provide air inside the nipper rolls 68 and 69. These nipples 91 are connected by air hose to an air supply (both not shown). Around nipper roll 68 in rolling contact are disposed three back-up rolls 93 which are held in place by shafts 94 and bushings 95. Sprocket 101 is mounted on one end of shaft 102 supported by bearing 103 mounted on end plate 66 and shaft 102 is also supported by bearing 104 mounted on end plate 105 of program cam housing 106. One of the shafts 94 for back-up rolls 93 has mounted thereon idler sprocket 108.

End plate 66 also has stub shaft 109 on which is mounted idler sprocket 110. Chain 111 is connected to sprocket 101, idler sprockets 108 and 110 and sprocket 112 mounted on shaft 90 of nipper roll 69.

Trunnion 57 extends through bearing 51 and mounted on its end is program cam housing 106 by means of its end plate 105 having hole 113. End plate 105 is held on trunnion 57 by means of screws 114. Mounted on trunnion 57 between housing 106 and spherical bearing 51 is sleeve 115 held in position by screw 116. One end of cable 117 is fastened to and partially wound around sleeve 115. The other end of cable 117 is connected to the end of the piston rod 118 of air cylinder 120 mounted on spaced plate 42. Cable 117 between sleeve 115 and cylinder 120 is wound around reel 121 where it is held between the peripheral annular flanges of reel 121 by idler wheel 122. Reel 121 and wheel 122 are also mounted on spaced plate 42.

Within program housing 106 is mounted shaft 124 by means of supports 125, 126 and 127, and bearings 128. Supports 125, 126 and 127 are mounted on plate 129 spaced from the floor 130 of housing 106 by spacers 131. Sprocket 132 is mounted on shaft 124 for free rotation and spaced from support 127 by means of spacer 133. Chain 134 connects sprocket 132 and sprocket 135 mounted on shaft 102 as well as idler sprocket 137 mounted by bushing (not shown) on pin 138 mounted on bent plate 140 which is bolted to end plate 105 by bolt 141.

A magnetic clutch indicated generally at 142 has a driving part 143 which is splined to sprocket 132 and therefore like sprocket 132 is freely rotating about shaft 124. The driven part 144 of magnetic clutch 142 is fastened and mounted on shaft 124. Between supports 126 and 127 are mounted on shaft 124 four program cams 148. Also mounted on shaft 124 are cams 149 and 150. Mounted on plate 129 of program housing 106 are four differential transformers 151, two of which are on each side of shafts 152 on which levers 153 are pivotally mounted. Shafts 152 are mounted in supporting member 154. Two of the transformers 151 are for vertical movement and control of frames 15 and two are for horizontal movement and control of spaced plates 42 and 43. Each transformer 151 has a movable armature 155 connected to a lever 153. Followers 157 near the end of levers 153 are in rolling engagement with program cams 148. Cam 149 in one complete revolution actuates air cylinder 120 by means of switch 160. Cam 150 in one complete revolution engages switch 161 to disengage magnetic clutch 142.

Mounted on the top of each plate 42 is bent plate 162. Mounted near the top of vertical support 17 are sprockets 163 and 164 by means of shafts 165 and 166. Chain 167 connects sprockets 163 and 164 and its ends are connected to bent plate 162. Cam supports 168 are bolted to sprockets 163 and 164. Cams 169 are mounted on supports 168. Spring-biased armature 170 of horizontal feed-back differential transformer 171 is pivotally connected to connecting link 172 which is connected to lever 173 pivotally mounted on plate 174 which is bolted in spaced relationship to vertical support 17. Follower pin 175 is mounted at the free end of lever 173 and is in sliding engagement with cam 169. Transformer 171 is within cover 176 fastened to plate 174 by bolts 177.

Cable support 181 is attached to hangers 30 and 31 by U-bolt 182 and nuts 183. Cam 184 and pulley 185 are mounted on pin 186 which is supported by bushing 187 mounted on support 188 on top member 13. Follower pin 189 is connected to the free end of lever 190 which is biased by spring 191 to provide sliding contact between pin 189 and cam 184. Between the follower pin and the fulcrum of the lever, connecting link 195 is attached to the lever and to spring-biased armature 197 of vertical feed-back differential transformer 198 within cover 199 held in place by screws 200. Transformer 198 is provided with electricity by wires (not shown) through conduit 201. Pulley 202 is also mounted on top member 13 near the corner by support 203. One end of cable 204 is connected to support 181 and the other end to weight 205 and cable 204 is in engagement with pulleys 185 and 202. Weight 205 moves within container 206 mounted on supporting pillar 14.

The trip starting mechanism 207 comprises a sheet 208 of semi-rigid plastic, such as phenol-formaldehyde plastic, supported between a pair of plates 209 of metal adjustably supported from shaft 210 by a pair of rods 211 and connectors 212. Shaft 210 is rotatably mounted between bearings 214 mounted on supporting pillars 14 by supporting members 215 and 216. Stub shaft 217 is supported by bearing 218 on supporting member 216 and at one end shaft 217 has mounted thereon arm 219 which rests on switch 220 and stop member 220a mounted on member 216. Dogs 221 and 222 are mounted on opposed ends of shafts 210 and 217, respectively, so that shaft 210 rotates a small amount before dog 221 engages dog 222 to rotate shaft 217 thereby lifting arm 219 from switch 220 to actuate timer (not shown) for actuating glass alignment assembly 260, air cylinder 120 and magnetic clutch 142, as well as motor 65 if desired. Notched bar 223 mounted on shaft 210 on return rotation of shaft 210 engages latch 224 biased by spring 225 in engaging position. Latch 224 is normally maintained out of engagement with bar 223 by solenoid 226 connected to latch 224 through bell crank 227 pivotally mounted on supporting member 228. Latch 224 slides within bearing support 229 mounted on supporting pillar 14 on which is also mounted supporting member 228 to which is fastened solenoid 226. Spring 225 is connected at one end to the upright portion 228a of supporting member 229 and at the other end to shoulder 224a of latch 224. Latch 224 slides within upright portion 228a.

Laminated glass assemblies are fed to the preliminary pressing apparatus by a delivery conveyor assembly indicated generally at 230. Assembly 230 is provided with roller slats 231 mounted in bearing members 232 fastened to the opposed sides of chains 233, each of which is moved in a cyclic path around sprockets 235 and 236 on shafts 237 and 239, respectively, mounted in bearings 240 and 241, respectively. Bearings 240 are mounted in holes 244 of side rails 246 and bearings 241 are slidably mounted in slots 248 by means of take-up guides 249 and take-up threaded shafts 250 held in position by nuts 251 on each side of flanges 252 on rails 246 which are supported by vertical members 253. Shaft 238 is driven by motor means (not shown). By means of chain 254 sprocket 255 mounted on shaft 238 drives sprocket 256 mounted on shaft 239 to drive sprockets 236. Assembly 230 is provided also with two idler rollers 257 mounted in bearings 258 on supports 259 mounted on rails 246.

Also mounted on one of side rails 246 is a glass alignment assembly indicated generally at 260 and having a mounting plate 261 bolted to side rail 246. Plate 261 has at openings 264 two parallel guide bushings 263 mounted normal thereto and guide rods 266 extend through both ends of bushings 263. At the outside ends of rods 266 are placed sleeves 267 held in position by nuts 268. Also mounted on plate 261 is air cylinder 269 with piston rod 270 extending through hole 271 in plate 261. The inside ends of rods 266 and the end of rod 270 outside cylinder 269 are connected to alignment bar 272 at the ends of which, by means of yokes 273 and pins 274, rollers 275 are mounted. Maximum movement of the bar 272 transverse to the movement of glass assemblies is controlled by adjustment of nuts 268 and sleeves 267, which serve as adjustable stops.

Figure 3:
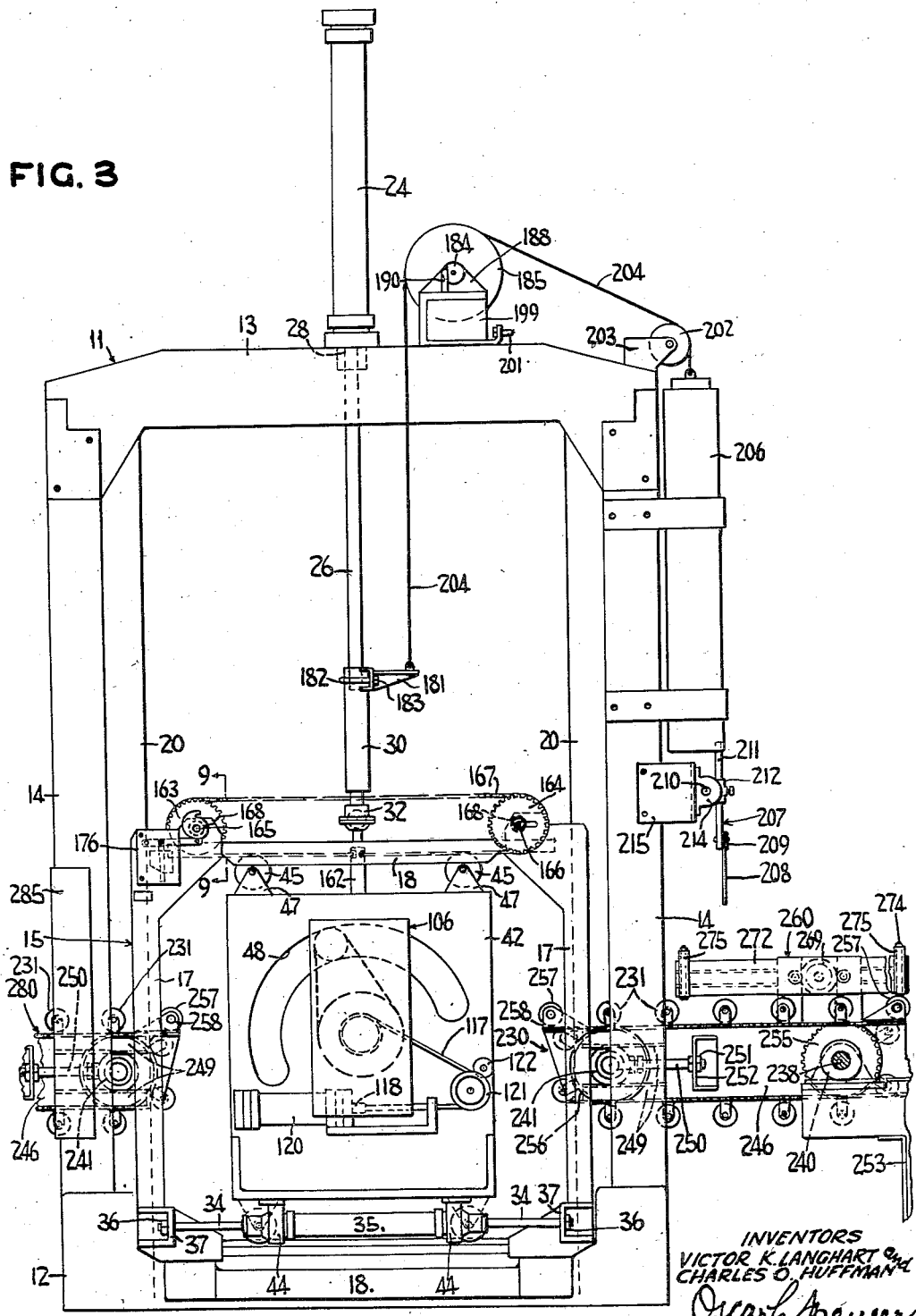
Figure 3 is a side elevation of the apparatus of Figure 1 along with glass assembly conveyor means for delivery and discharge of the assemblies to and from the pressing apparatus.
Figure 4:
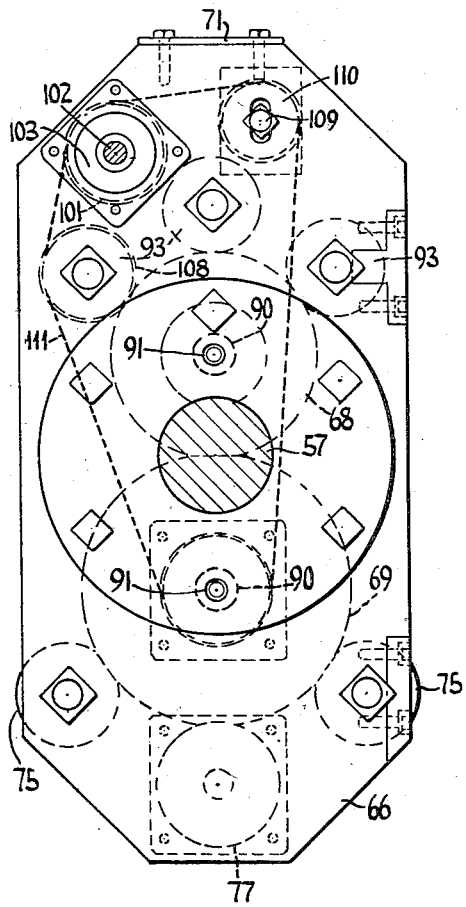
Figure 4 is an enlarged cross section of the preliminary pressing apparatus taken along line 4—4 of Figure 1.
Figure 5:
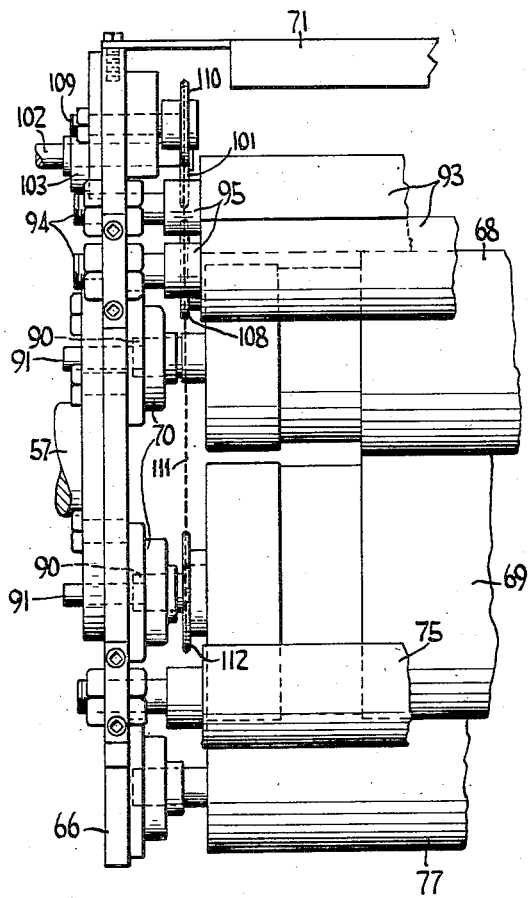
Figure 5 is an enlarged fragmentary front elevation of the roll housing assembly of Figure 1.

A discharge conveyor assembly indicated generally at 280 contains the same structural components as assembly 230, except, of course, it does not have glass alignment assembly 260. In other words, glass laminates are deposited on the discharge conveyor assembly 280 whereby the laminated assemblies are carried away to another longer conventional conveyor by means of idler rollers 257 and roller slats 231. Other parts of assembly 280 that are numbered in Figure 3 are also given the number of its similar component of assembly 230.

In two containers 285 attached to two diametrically opposed supporting pillars 14 are mounted the vertical and horizontal control assemblies which are identical in structure and contain a servo valve and an electronic amplifier. They are described below in connection with Figure 10, which is schematic for each of the four positioning servo mechanisms. The following description is with reference to the vertical movement and control of one of frames 15 and is equally applicable to the vertical movement and control of the other frame 15 or the separate horizontal movement and control of spaced plates 42 and 43. Feed-back differential transformer 198 and program differential transformer 151 are connected in voltage opposition. Servo valve indicated generally at 289 contains servo valve differential transformer indicated generally at 290 which is also connected in voltage opposition to program differential transformer 151. A differential transformer is a transducer that will generate an A.-C. signal directly proportional to the displacement of the armature of the transformer from the electrical center of the transformer winding. The transformer contains essentially two primary coils, which are connected series aiding and thus are shown as one coil, P, in Figure 10, two secondary coils, $S_1$ and $S_2$, which are connected series bucking, and an armature of magnetic material. The primary coils P of the transformers 151, 198 and 290, respectively, are connected to the six-volt A.-C. side of transformer 293 in electronic amplifier 294. Since the secondary coils are connected bucking their output voltages are 180 degrees out of phase. The armature is located so that it alters the relative flux distribution existing between the primary and secondary coils and its movement generates the A.-C. signal as mentioned above. A proportional band potentiometer 295 is connected in the circuit of the primary coil P of servo valve differential transformer 290. The secondary coils of transformers 151, 198 and 290 are connected as stated above to the input 296 of electronic amplifier 294, i. e., the secondary coils $S_1$ and $S_2$ of transformers 198 and 290 are in voltage opposition to the secondary coils $S_1$ and $S_2$ of transformer 151. Output 297 of electronic amplifier 294 is connected to a reversible two-phase servo motor 298. Motor 298 and transformer 293 are connected to a 110 volt 60-cycle A.-C. source (not shown). Armature 155 of program differential transformer 151 is moved by follower 157 rolling along the periphery of cam 148 connected on shaft 124 through magnetic clutch 142 to sprocket 132 and chain 134. The driving and driven parts 143 and 144 of magnetic clutch 142 are pulled together in operative engagement by coil 299 connected to timer (not shown) actuated by trip mechanism 207 (shown in Figure 1). Armature 197 of feed-back differential transformer 198 is moved by cam follower 189 which follows the periphery of cam 184 on pin 186 mounting pulley 185 and operated by cable 204 connected to frame 15. Cable 204 is in engagement with idler pulley 202 and connected to weight 205. Vertical hydraulic cylinder 24 is connected to frame 15 through piston rod 26 and oil lines 300 and 301 connect cylinder 24 to a four-way valve 302 having inlet and outlet lines 303 and 304, respectively. Piston 306 of the four-way valve 302 is operatively connected at one end to eccentric 308 which is mounted on shaft 309, the latter being rotated by motor 298 through gears 311 and 312. The other end of piston 306 of four-way valve 302 is operatively connected to the armature 314 of servo valve differential transformer 290. Piston 315 of cylinder 24 is moved by oil introduced through either line 300 or line 301.

Figure 10:
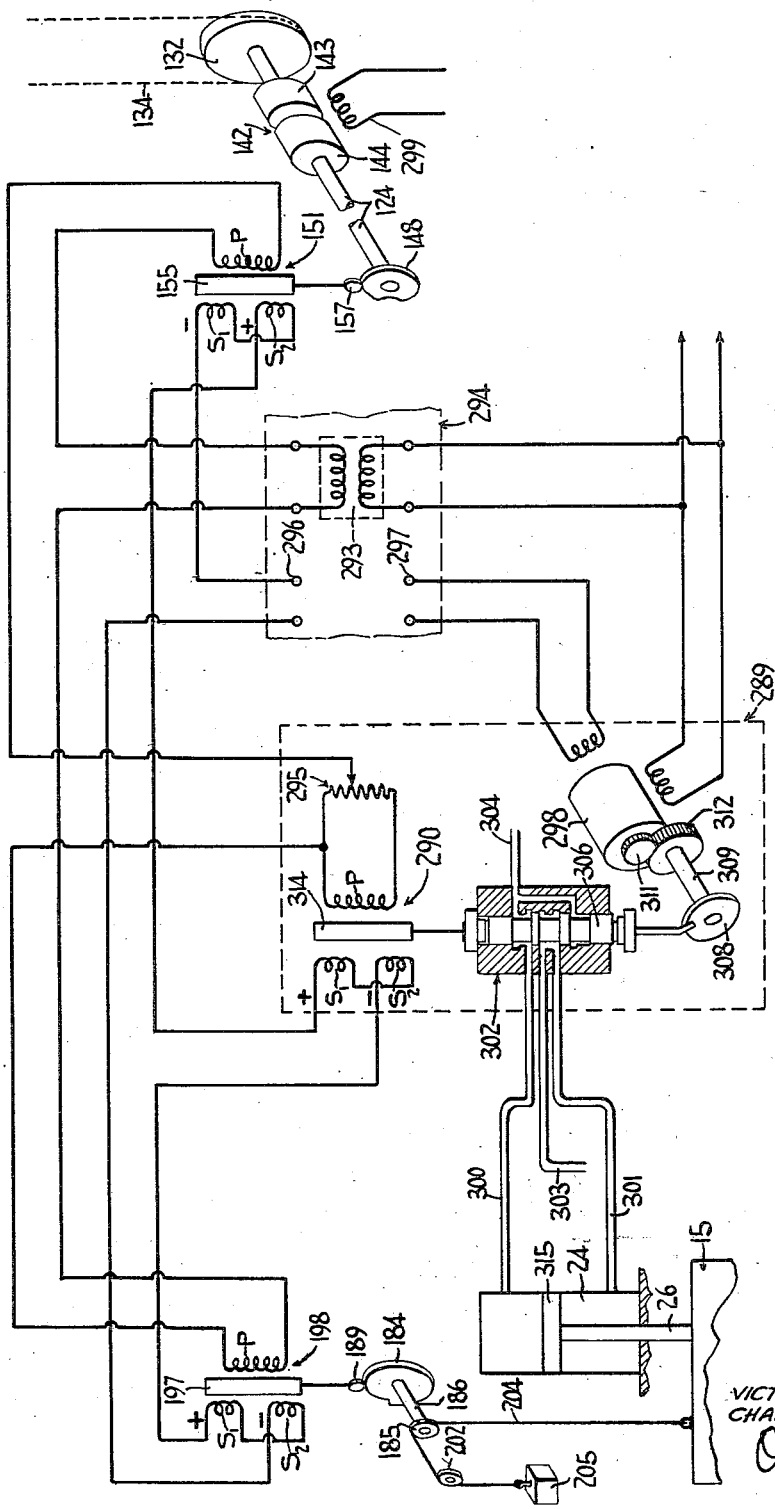
Figure 10 is a schematic drawing of a positioning servo mechanism for movement of the ends of the nipper rolls in vertical and horizontal directions.

In the foregoing description and in the drawings (except Figure 10) none of the electric wiring and oil lines is presented, but the manner of appropriate wiring and connection of oil lines to oil pressure source and oil sump will be apparent to one skilled in the art after reading the description anent Figure 10 and examining said figure. The same is true with regard to the timers referred to and valves and coils also referred to.

Operation

A bent glass laminated assembly with bent ends upward and its longitudinal axis parallel to travel is conveyed through a conventional furnace (not shown) for heating the laminated assembly to the proper temperature for preliminary pressing. The delivery end of the conventional conveyor (not shown) for passing the laminated assembly through the furnace abuts the end of the delivery conveyor assembly 230 by which the laminated assembly is moved toward the preliminary pressing apparatus. The leading edge of the bent laminated assembly strikes sheet 208 which is moved thereby rotating shaft 210 sufficiently for dog 221 to engage and rotate dog 222 whereby shaft 217 raises arm 219 away from switch 220 which is thus closed thereby actuating three timers (not shown).

Switch 220 actuates a solenoid valve (not shown) to admit air under pressure to operate air cylinder 120 whereby rod 118 is moved into cylinder 120 as far as it can go, thereby pulling on cable 117 to rotate trunnion 57 and, of course, roll housing 56 to present the nipper rolls 68 and 69 in proper position about their contact axis to receive the leading edge of the laminated assembly being brought therebetween by delivery conveyor assembly 230. The solenoid is de-energized by one of the timers when it actuates magnetic clutch 142.

One of the timers actuated by switch 220 after a predetermined interval closes the electric circuit to open a four-way valve (not shown but similar to valve 302 and connected to an air source) to supply air to cylinder 269 whereby alignment bar 272 and its attached rollers 275 move across conveyor assembly 230 to move the glass laminated assembly transversely until it is in proper alignment with respect to the preliminary pressing apparatus. The alignment bar 272 is moved by cylinder 269 until stopped by sleeves 267 and nuts 268. The second timer then actuates the four-way valve to return alignment bar 272 to its position against mounting plate 261.

Solenoid 226 is de-energized by a timer (not shown) actuated by switch 229 for a short interval to permit latch 224 to engage notched bar 223 on the bar's downward movement after passage of the leading edge of the laminated assembly. This latch operation prevents oscillation of sheet 208. Then the solenoid is energized by the timer to disengage latch 224. Similar de-energizing of the solenoid 226 occurs with movement of sheet 208 by the trailing edge of the laminated assembly. By this latching mechanism the sheet 208 is certain to be in a vertical position ready to engage successive laminated assemblies. If desired, the solenoid is not re-energized to disengage latch 224 until the bent glass laminated assembly has passed completely between nipper rolls 68 and 69. This arrangement stops movement of the next bent glass laminated assembly beyond trip starting mechanism 207 until limit switch 220 would actuate the timer.

Because glass assemblies are passed through the furnace only a short distance apart in production line operation it is preferred that motor 65 operate continuously, although, of course, the timer actuated by switch 210 could start operation of motor 65 after a predetermined interval.

Motor 65 through sprocket 83, chain 84 and sprocket 82 drives back-up roll 77 on shaft 80. Rotation of roll 77 produces rotation of nipper roll 69 with which it is positioned in frictional engagement. Similarly rotation of nipper roll 69 produces rotation of back-up rolls 75 and nipper roll 68, the latter's rotation producing also by frictional engagement rotation of back-up rolls 93. Sprocket 112, which rotates with nipper roll 69, produces rotary motion to the driving part 143 of magnetic clutch 142 by means of chain 111, sprocket 101, shaft 102, sprocket 135, chain 134, and sprocket 132. With continuous operation of motor 65 there is continuous operation of the pair of nipper rolls 68 and 69 and the driving part 143 of the magnetic clutch 142.

At the moment that the leading edge of the bent glass laminated assembly is presented by delivery conveyor assembly 230 to the contacting nipper rolls 68 and 69 for passage therebetween, the third timer actuates coil 299 to engage the magnetic clutch 142 whereby driven part 144 is rotated by driving part 143. Program cams 148 begin rotation with that of driven part 144 also on shaft 124. Each of program cams 148 has been constructed to provide the proper amount of vertical or horizontal movement and control of spaced plates 42 and 43. The vertical movement of each spaced plate is obtained from a program cam and the horizontal movement of each spaced plate is also obtained from a program cam. The construction of the profile of each cam is determined by the shape of the bent laminated assembly to be preliminary pressed by nipper rolls 68 and 69. This construction will be described hereinafter. Movement of spaced plates 42 and 43 with respect to one another without impairing support and free rotation of roll housing 56 is possible because of the mounting of trunnions 57 and 58 in spherical bearings 51 and 52 mounted in spaced plates 42 and 43. As the glass laminated assembly passes between the nipper rolls 68 and 69 the rolls 68 and 69 rotate about their axis of contact by means of trunnions 57 and 58 to provide optimum pressure normal to the laminated assembly. Due to the longitudinal curvature of the glass laminated assembly continuous and varying rate of change of rotation of roll housing 56 is produced thereby. Because of the twist of the bent glass laminated assemblies about their longitudinal axes when the assemblies are the modern wrap-around windshields, the spaced plates 42 and 43 are moved in a predetermined manner as herein described to move the ends of the nipper rolls 68 and 69 to press the laminated assemblies with a uniform pressure across the twisted sections.

Vertical movement of spaced plates 42 and 43 is accomplished by two of program cams 148 by actuation of hydraulic cylinders 24 and 25 which move frames 15 relative to fixed housing 11. Vertical movement of frames 15 produces vertical movement of supported plates 42 and 43.

Horizontal movement of spaced plates 42 and 43 is accomplished by the other two program cams 148 through hydraulic cylinders 35 which provide horizontal movement of spaced plates 42 and 43 with respect to supporting frames 15. Wheels 45 and tracks 40 permit relative horizontal movement between plates 42 and 43 and frames 15.

Each of the program cams 148 actuates a hydraulic cylinder, either 24, 25 or one of cylinders 35, to provide a predetermined amount of movement of piston rod to the cylinder in the following manner. The control of the movement of the piston to ensure reaching the position called for by the cam with a minimum of or an elimination of oscillation of the rod is also described. Referring to Figure 10, which illustrates schematically the vertical movement means for one of frames 15 as called for by rotating program cam 148 and the feed-back control means to ensure proper positioning of the hydraulic cylinder rod as called for by cam 148, rotation of cam 148 produces movement of armature 155 by means of cam follower 157. Change in position of armature 155 produces a change in voltage of program differential transformer 151 so that its voltage is no longer balanced by the opposed voltages of feed-back differential transformer 198 and servo valve differential transformer 290. This voltage difference produces an error signal to input 296 which is amplified by electronic amplifier 294. The amplified output at 297 of electronic amplifier 294 actuates motor 298 of servo valve 239 to provide rotation of gear 311 in a direction and amount dependent upon whether or not the voltage of transformer 151 was increased or decreased.

Rotation of gear 311 produces rotation of eccentric 308 through gear 312 and shaft 309. Movement of eccentric 308 results in movement of piston 306 from a closed position to either of the two open positions of four-way valve 302. The error signal from the electronic controller thus acts to admit fluid through valve 302 in a direction and rate determined by the error signal. Valve 302 provides hydraulic fluid to hydraulic cylinder 24 whereby piston rod 26 raises frame 15 in one open position of four-way valve 302 and lowers frame 15 in the other open position of valve 302. Thus it is seen a change in voltage of transformer 151 produces an upward movement of frame 15 and an opposite change in voltage produces a downward movement of frame 15. In the illustration with valve 302 in open position hydraulic fluid from line 303 passes through valve 302 to line 301 into the lower compartment of cylinder 24 thereby raising piston 315 and forcing oil out of the upper compartment and through line 300 into valve 302 and out line 304. Of course, raising piston 315 raises frame 15 by connecting rod 26.

Vertical movement of frame results in movement of cable 204 engaging pulley 185 thereby rotating pin 186 and thus also linear cam 184. Rotation of cam 184 produces movement of armature 197 through follower 189, thereby changing the voltage of vertical feed-back transformer 194. Thus movement of frame 15 by means of valve 302 and cylinder 24 produces a change in voltage in transformer 198 directly proportional to the position of frame 15.

Before hydraulic cylinder 24 has operated, the piston 306 of valve 302 has been moved to an open position as mentioned above. This axial linear movement of piston 306 produces a similar linear movement of armature 314 connected to one end of piston 306. Movement of armature 314 of servo valve differential transformer 290 produces a voltage change in transformer 290 before there is any voltage change in transformer 198. This voltage change is adjusted, before operation of the pressing apparatus, by means of proportional band potentiometer 295 so that it is only a fraction of the voltage change in transformer 151. This voltage change in transformer 290 results in an elimination of the error signal to 296 because the voltages of transformers 290 and 151 are opposed. Fluid flows through valve 302 to operate cylinder 24 raising frame 15. As mentioned above, upward movement of frame produces a change in voltage of transformer 198. The voltage of transformer 198 continues to change with oil flow through valve 302 until the sum of its voltage changes and that of transformer 290 is greater than the voltage change produced by movement of cam 148. This produces an error signal at input 296 opposite in sign to the initial error signal and resulting in an output signal from 297 to actuate motor 298 to move piston 306 toward the closed position, thereby changing voltage of transformer 290. Additional flow of oil at a reduced rate continues to change the voltage of transformer 198 resulting in a continuing error signal until the total change of voltage of transformer 198 equals the voltage change of transformer 151 by which time valve 302 has been completely closed by motor 298 so that the voltage of transformer 290 is the initial value and the opposed voltages are in balance. Thus it is seen that frame 15 reaches its predetermined position change from the previous position without dampened oscillation on each side of the predetermined position. The proportional band potentiometer 295 is used to acquire different degrees of control sensitivity to the servo mechanism.

Cam 150 rotates with cams 148 and at the end of the passage of the laminated glass assembly through nipper rolls 68 and 69 cam 150 actuates switch 161 to reset timers and relays (not shown) permitting the operation of switch 220 to start another cycle.

Cam 149 also rotates with cams 148 and at the end of a complete cycle of the program cams 148 actuates switch 160 to disengage magnetic clutch 142.

In the foregoing vertical and horizontal feed-back control means to ensure proper positioning of movable frames 15 and spaced plates 42 and 43, respectively, are described. Pulleys 185 and 202 and cables 204 are used in the vertical feed-back control means and sprockets 163 and 164 and chains 167 are used in the horizontal feed-back control means. Of course, chain and sprockets can be substituted for cable and pulleys and vice versa. Chains and sprockets for both horizontal and vertical feed-back control means are preferred.

Figure 14:
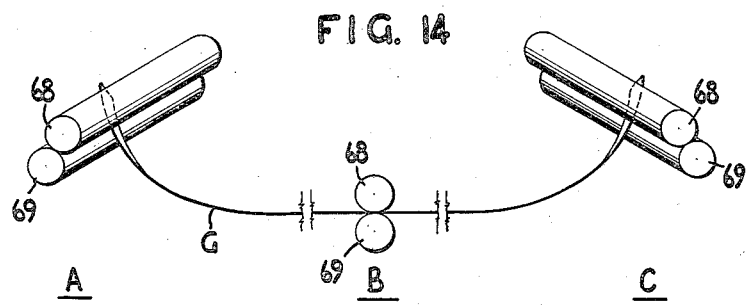
Figure 14 is a schematic drawing of three positions assumed by the pair of pressing rolls during the passage of a curved laminated assembly having end sections that are twisted about the longitudinal axis of the assembly.

In Figure 14 there are shown schematically three positions, A, B, and C, of the pair of rolls 68 and 69 of the pressing apparatus of this invention in their relationship to an assembly G of two sheets of curved glass and an interlayer being pressed by the pair of rolls. The views A, B and C show the positions of the rolls as the leading edge, the central portion and the trailing edge, respectively, of assembly G are passing between the pair of rolls. The manner of positioning the rolls will be apparent from the preceding detailed description of the apparatus.

Program cam design

For each pattern of bent glass laminated assembly, there is made a set of four program cams whose profiles control the vertical and horizontal positions of each end of the roll housing 56 and its nipper rolls 68 and 69 in correct relation to the glass assembly as it passes between the nipper rolls.

A piece of heavy paper is ruled off in equal transverse lines representing increments of distance traveled by the circumference of nipper rolls 68 and 69 along the curved glass. If the rolls are cylindrical, the lines will be parallel and perpendicular to the center line of the glass. If the rolls are tapered, the lines will be skewed corresponding to the taper of the rolls. The paper is closely fitted around the piece of curved glass bent to the required pattern. Since the nipper rolls grip the glass firmly with negligible slippage the lines on the paper then represent the lines of contact as the nipper rolls travel along the glass.

The path of the nipper rolls along the glass is determined solely by the entering angle of the nipper rolls and their taper, if any. Nipper roll positions serve to accurately determine the entering angle to run the glass through the machine in a straight line and to position the nipper rolls so that they put minimum stresses on the glass other than the pressing action normal to the glass surface.

The glass with the ruled paper on it is placed on a table with the curved ends pointing upward. A straight edge is placed along each line to project the line of roll contact to reference lines, usually 12″ either side of the center line of the glass. The vertical distance from the table to the line is measured at the reference lines to determine the vertical components of the nipper roll motion and the horizontal projection of the roll contact line is drawn between the reference lines to determine the horizontal components of the nipper roll motion.

The required positions of spaced plates 42 and 43 in which are mounted spherical bearings 51 and 52 at each end of the roll housing 56 for nipper rolls are calculated by mathematically extending the vertical and horizontal components of each nipper roll contact line from the reference lines to the centers of bearings 51 and 52 by similar triangles. For convenience, the total horizontal bearing motion provided by movement of spaced plates 42 and 43 is divided equally between the sides of the pressing apparatus or machine so that the rolls rotate around the center line of the machine. The vertical bearing position and thus spaced plates 42 and 43 for each end of the rolls is calculated in relation to the glass line. Thus the two horizontal and two vertical positions for spaced plates 42 and 43 necessary to place the nipper rolls in the desired position are calculated for each line of contact as the glass travels through the nipper rolls.

From the desired positions of the spherical bearings 51 and 52 and spaced plates 42 and 43 for each line and their spacing along the glass, the program cams may be designed. Hydraulic servo valve 289 operates to move the core of feed-back differential transformer 171 or 198 to exactly the same distance from the transformer's zero point as the core of program differential transformer 151 is from its zero point. The ratio of spaced plate 42 or 43 to feed-back transformer core motion is determined by the mechanical arrangement of the sprocket, cam, and lever of the feed-back cam mechanism. Thus 30 inches vertical motion and 16 inches horizontal motion of the spaced plates 42 and 43 relative to fixed housing move the cores of the feed-back transformers 0.10 inch. The ratio of cam follower 157 motion to program cam transformer armature 155 motion is determined by the cam follower lever ratio. One inch motion of all program cam followers 157 moves the armature 155 of the program transformers 151 by 0.10 inch. Thus an inch motion of the program cam follower 157 will give 30 inches vertical motion to spaced plate 42 or 43 and 16 inches horizontal motion to spaced plate 42 or 43.

Program cams 148 are driven from the rotation of the inflated nipper rolls 68 and 69 through a sprocket and magnetic clutch arrangement so that their angular rotation represents length of glass passing through the machine. The clutch is energized as previously mentioned by a timer started by the approach of the glass to the machine.

The nipper roll 69 to program cam 148 ratio is chosen so that one revolution of cam 148 corresponds to the maximum length of bent glass laminated assembly to be pressed plus sufficient time to smoothly reposition the nipper rolls to the starting position.

The transverse lines ruled on the paper pattern are chosen so that they represent convenient angles of rotation of program cam 148, in this case 10°.

Thus, each division on cam 148 represents a roll contact line on the glass assembly while the radius of cam 148 represents a vertical or horizontal spaced plate 42 or 43 position calculated from the contact line.

While the foregoing has described a preferred embodiment of the pressing apparatus, many modifications are apparent to one skilled in the art and it is not intended that this invention be limited to this preferred embodiment. The present invention is not limited except by the following claims.

We claim:

1. Apparatus for the pressing of bent laminated assemblies comprising two matched sheets of curved glass and a thermoplastic interlayer, said apparatus comprising a fixed housing, a pair of spaced supporting members mounted each for separate horizontal and vertical movement relative to the fixed housing, a roll housing rotatably mounted to the pair of spaced supporting members, a pair of yieldable, opposing rolls rotatably mounted in said roll housing for frictional engagement against opposite surfaces of the assemblies, means for separately moving the pair of spaced supporting members in a horizontal direction relative to the fixed housing, means for separately moving the pair of spaced supporting members in a vertical direction relative to the fixed housing, and means for driving at least one of the rolls.

2. Apparatus for the pressing of bent laminated assemblies comprising two matched sheets of curved glass and a thermoplastic interlayer, said apparatus comprising a fixed housing, a pair of spaced bearing housings mounted each for separate horizontal and vertical movement relative to the fixed housing, a roll housing having trunnions, spherical bearings mounting the trunnions in the bearing housings, a pair of yieldable, opposing rolls rotatably mounted in said roll housing for frictional engagement against opposite surfaces of the assemblies, means for separately moving the pair of spaced bearing housings in a horizontal direction relative to the fixed housing, means for separately moving the pair of spaced bearing housings in a vertical direction relative to the fixed housing, and means for driving at least one of the rolls.

3. Apparatus for the preliminary pressing of bent laminated assemblies comprising two matched sheets of curved glass and a thermoplastic interlayer, said apparatus comprising a fixed housing, a pair of spaced movable housings each mounted for separate vertical movement relative to the fixed housing, a pair of spaced plates mounted to the movable housings each for separate horizontal movement relative to the movable housings, a roll housing rotatably mounted to the pair of spaced plates, a pair of yieldable, opposing rolls rotatably mounted in said roll housing for frictional engagement against opposite surfaces of the assemblies, means for separately moving the movable housings, means for separately moving the spaced plates, and means for driving at least one of the rolls.

4. Apparatus for the preliminary pressing of bent laminated assemblies comprising two matched sheets of curved glass and a thermoplastic interlayer, said apparatus comprising a fixed housing, a pair of spaced movable housings each mounted for separate vertical movement relative to the fixed housing, a pair of spaced plates mounted to the movable housings each for separate horizontal movement relative to the movable housings, said plates each having a bearing housing, a roll housing having trunnions, spherical bearings mounting the trunnions in the bearing housings, a pair of yieldable, opposing rolls rotatably mounted in said roll housing for frictional engagement against opposite surfaces of the assemblies, means for separately moving the movable housings, means for separately moving the spaced plates, and means for driving at least one of the rolls.

5. Apparatus for the preliminary pressing of bent laminated assemblies comprising two matched sheets of curved glass and a thermoplastic interlayer, said apparatus comprising a fixed housing, a pair of spaced plates separately mounted for horizontal and vertical movement relative to the fixed housing, a roll housing rotatably mounted to the pair of spaced plates, a pair of yieldable, opposing rolls rotatably mounted in said roll housing for frictional engagement against opposite surfaces of the assemblies, a first pair of fluid-operated means connected to the fixed housing and the plates to provide relative horizontal movement between the fixed housing and the plates, a second pair of fluid-operated means connected to the fixed housing and the plates to provide relative vertical movement between the fixed housing and the plates, means connected to said pairs of fluid-operated means for predetermined control of amount and direction of flow of fluid therein to provide relative movements of said plates, and means for driving at least one of the rolls.

6. The apparatus of claim 5 wherein the means for predetermined control of amount and direction of flow of fluid comprises a valve, a differential transformer having a movable armature to provide a voltage change, means responsive to voltage change to open said valve, means connected to said armature to provide predetermined movement of the armature within the transformer.

7. The apparatus of claim 6 wherein means to provide predetermined movement of the armature includes a cam of predetermined periphery and mounted to the roll housing for rotation with the yieldable rolls.

8. The apparatus of claim 7 wherein the means for predetermined control of amount and direction of flow of fluid comprises in addition means responsive to voltage change to close the valve, said means including a differential transformer having voltage opposed to that of the differential transformer connected to the means responsive to voltage change to open the valve and having coils and a movable armature with the armature connected to the spaced plate and the coils mounted to the fixed housing whereby relative movement between plate and housing moves the armature and the voltage change moves the valve toward closed position.

9. Apparatus for the preliminary pressing of bent laminated assemblies comprising two matched sheets of curved glass and a thermoplastic interlayer, said apparatus comprising a fixed housing, a pair of spaced movable housings mounted for vertical movement relative to the fixed housing, a pair of spaced plates mounted to the movable housings for horizontal movement relative to the movable housings, said plates each having bearing housing, a roll housing having trunnions, spherical bearings mounting the trunnions in the bearing housings, a pair of yieldable, opposing rolls rotatably mounted to the roll housing for frictional engagement against opposite surfaces of the assemblies, a pair of hydraulic cylinders connected to the fixed housing and each to one of the pair of movable housings to provide vertical movement of the movable housings, a pair of hydraulic cylinders each connected to one of the movable housings and to one of the spaced plates to provide horizontal movement of the plates, valved means for separately actuating the hydraulic cylinders in a predetermined manner, and means for driving at least one of the rolls.

10. The apparatus of claim 9 wherein the valved means for actuating the hydraulic cylinder comprises a four-way valve to provide fluid to the hydraulic cylinder to impart relative movement of piston and cylinder, and means for opening and closing said valve for a predetermined pattern of movement of the roll housing relative to the fixed housing.

11. The apparatus of claim 9 wherein the valved means for actuating the hydraulic cylinder comprises a four-way valve to provide fluid to either compartment of said hydraulic cylinder, valve-opening means responsive to a voltage change, a differential transformer having a movable armature to provide a voltage change, said armature being connected to said valve-opening means, and cam means connected to said armature.

12. The apparatus of claim 11 wherein said cam means includes a cam mounted to the roll housing for rotation with the rolls.

13. The apparatus of claim 12 and further including a differential transformer having a movable armature and connected in voltage opposition to the differential transformer of the valve-opening means, and cam means responsive to movement of one of the spaced plates, said cam means connected to said armature of said differential transformer to provide movement thereof whereby a change of voltage is provided to oppose the change of voltage of transformer of the valve-opening means.

14. Apparatus for the preliminary pressing of bent laminated assemblies comprising two matched sheets of curved glass and a thermoplastic interlayer, said apparatus comprising a fixed housing, a roll housing mounted for rotation within the fixed housing and for horizontal and vertical separate movement of each end of the roll housing through which the axis of rotation passes, a pair of yieldable, opposing rolls rotatably mounted in said roll housing for frictional engagement against opposite surfaces of the assemblies, means for driving at least one of the rolls, and means for providing to the ends of the roll housing for said horizontal and vertical separate movement in a predetermined manner, said last-mentioned means including two horizontal-movement-positioning assemblies and two vertical-movement-positioning assemblies, each of said positioning assemblies comprising first and second differential transformers each having a movable armature, said transformers being connected in voltage opposition, a first cam means to provide movement of the armature of the first differential transformer, said cam means containing a cam rotatably connected to one of the yieldable rolls, means responsive to a difference in voltage between the transformers due to movement of the armature of the first transformer to move an end of the roll housing in the plane of the end, a second cam means responsive to said movement of the end to provide movement of the armature of the second transformer whereby movement of the end to the position indicated by voltage change in the first transformer as determined by the first cam produces sufficient voltage change in the second transformer to eliminate said voltage difference.

15. The apparatus of claim 14 wherein the means responsive to the voltage difference between the first and second transformers to move an end of the roll housing includes a hydraulic cylinder, a four-way valve connected to the cylinder to provide two-way movement thereof, and motor means for operating the valve and responsive to said voltage difference whereby the valve is open during the voltage difference and closed when the voltages are balanced.

16. The apparatus of claim 15 and further including a third differential transformer having a movable armature, said third transformer also being connected in voltage opposition to the first differential transformer, and the third armature is connected to the valve to provide movement of the third armature with valve movement, whereby improved control of positioning of the end of the roll housing is maintained.

References Cited in the file of this patent

UNITED STATES PATENTS

| | | |
|---|---|---|
| 2,525,980 | Walters | Oct. 17, 1950 |
| 2,601,794 | Wood | July 1, 1952 |